Aug. 7, 1945.   B. FORMAN   2,381,213
MEANS FOR IMPARTING GYRATORY AND OTHER
MOTIONS TO FLEXIBLE TUBULAR MEMBERS
Filed May 20, 1944
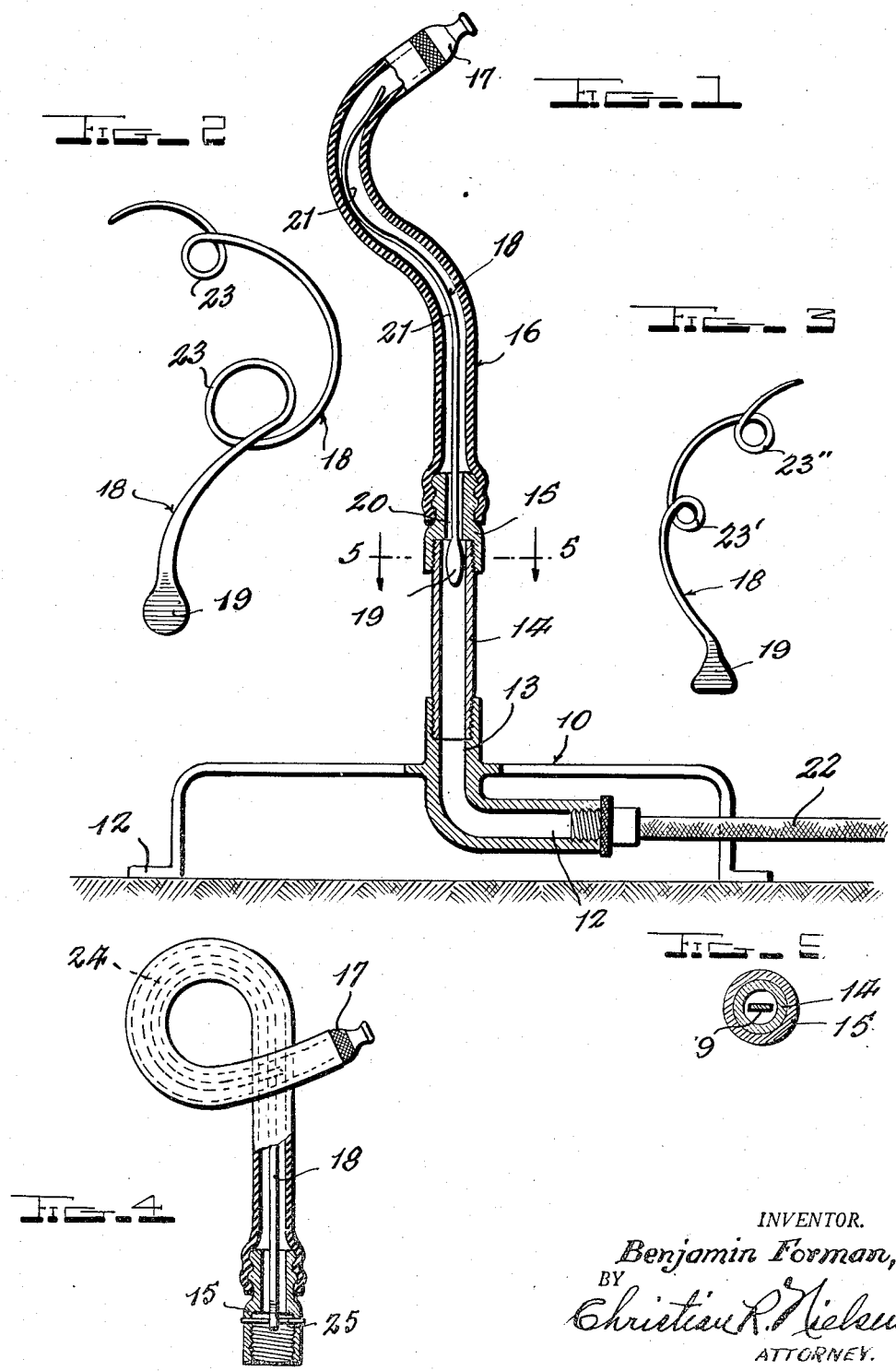
INVENTOR.
Benjamin Forman,
BY
Christian R. Nielsen
ATTORNEY.

Patented Aug. 7, 1945

2,381,213

UNITED STATES PATENT OFFICE 2,381,213

MEANS FOR IMPARTING GYRATORY AND OTHER MOTIONS TO FLEXIBLE TUBULAR MEMBERS

Benjamin Forman, Stelton, N. J.

Application May 20, 1944, Serial No. 536,564

1 Claim. (Cl. 299—69)

This invention relates to a means for imparting motion to flexible, tubular members, and it consists in the constructions, arrangements and combinations herein described and claimed.

It is the cardinal object of the invention to provide a means in which a flexible discharge hose member is employed, having a rigid member interiorly thereof suitably curved so as to impart gyratory movements to the hose under application of fluid pressure within the hose.

More specifically, it is an object of the invention to provide a lawn sprinkler in which a strand is embodied in the flexible discharge member, the strand being so bent or curved as to provide predetermined gyratory movements of the discharge member.

Additional objects, advantages and features of invention will be apparent from the following description, considered in conjunction with the accompanying drawing, in which Figure 1 is a vertical section partly in elevation, illustrating the invention.

Figure 2 is a side elevation of a modified form of the strand member which may be employed in the hose.

Figure 3 is a further form of the strand member.

Figure 4 is an elevation, partly in section, of a further form of the device.

Figure 5 is a cross section on the line 5—5 of Figure 1.

In the present instance, I have shown and described my invention as applied to a lawn sprinkler, but I do not limit myself to this specific use, since the principle here shown and described may be employed in any situation where a predetermined movement of a fluid conducting hose is desired.

There is illustrated a base member 10 including supporting feet 11, the base having integrally formed therewith a water inlet 12 and a vertically disposed outlet 13. The above structure is common in many lawn sprinklers and forms no specific features of my invention, since obviously, other types of sprinkler bases may be employed.

The outlet 13 is interiorly threaded to receive a nipple 14, the upper end of which is threaded to receive an adapter 15, the latter having securely fixed thereto a flexible hose 16. The hose 16 may be of any approved or desired length, from several inches to several feet, this depending upon the gyrations of the flexible hose, that it is desired to obtain.

Upon the terminal end of the hose 16 an adjustable restrictor 17 is mounted for regulating the flow or spray of fluid or water. These restrictors are well known in the art and a detailed disclosure is not believed essential to obtain an understanding of the invention.

Threaded through the adapter 15 and partially through the hose 16 there is a rigid strand 18, the lower end of which is flattened, as at 19, providing a diameter greater than the bore 20 of the adapter, thus preventing the strand 18 passing outwardly through the hose under action of fluid pressure. The strand 18 is provided with any suitable number of bends or convolutions 21 and is of a length stopping short of the restrictor 17. It will be noted that some of the convolutions or bends contact the interior of the hose.

In use, in the case of a lawn sprinkler, water is admitted to the inlet 12 by means of a hose 22, passing through the outlet 13, nipple 14 and adapter 15, and into the flexible hose 16. The water being under pressure, the hose will be caused to partake of gyrations about the axis of the strand 18, and since the strand is formed with predetermined bends or convolutions, movements of the hose will accord thereto.

In Figure 2, the strand 18' is formed as a tapering member, with a pair of helices 23 of left hand turns, and of different diameters, while in Figure 3, the helices 23' and 23'' are reversely bent from that shown in Figure 2, and also, the helix 23'' is of greater diameter than the helix 23'.

In Figure 4, a simple helical convolution 24 is embodied in the strand, the lower end of which is anchored upon a transverse pin 25, eliminating the need for flattening the strand as shown in the previously described forms.

It will be readily understood that various gyratory movements can be imparted to the hose by merely forming the strand with the desired bends, and where the short type of sprinkler shown in Figure 4 is employed, a very rapid gyration is produced, discharging water in a restricted area; while using a longer type hose and appropriate strand, a wider spread of water will be effected.

While I have shown and described certain preferred forms of the device, this is by way of illustration only, and I consider as my own all such modifications in construction as fairly fall within the scope of the appended claim.

I claim:

A flexible hose one end of which is adapted to be fixedly attached to a water supply; a water exit nozzle carried by the free end of said flexible hose; and a rigid convolute rod positioned within said flexible hose and extending therein from the lower end of said flexible hose to a point near said nozzle, said rod being revolvably carried by the lower portion of said flexible hose, whereby pressure of the water flowing through the flexible hose will impart gyratory movement to said hose.

BENJAMIN FORMAN.